UNITED STATES PATENT OFFICE.

EBENEZER G. POMEROY, OF NEW YORK, N. Y.

IMPROVED METHOD OF CONVERTING IRON INTO STEEL.

Specification forming part of Letters Patent No. 29,909, dated September 4, 1860.

*To all whom it may concern:*

Be it known that I, EBENEZER G. POMEROY, of the city, county, and State of New York, have invented a new and useful Improvement in the Conversion of Cast, Pig, or other Iron into Steel; and I do hereby declare that the following is a full, clear, and exact description of the same.

My invention consists in the conversion of cast, pig, or other iron into steel by its treatment in a molten state with a compound of crude potash or other alkali, pulverized oyster-shells, or carbonate of lime, oxide of manganese, and charcoal.

The apparatus which I propose to use in the performance of my invention consists of a reverberatory furnace of form substantially similar to a puddling-furnace, with the flue and stack at the opposite end to the fire-place, and a basin of sufficient size to hold the charge. Directly under the flue of this furnace I have a working-door of a size only sufficient to permit the stirring of the metal with a ravel, and this door being directly opposite to the fire-bridge, the current of cold air which is unavoidably admitted in working is met by the current of hot air and gases or flame from the furnace and carried with it up the stack without being permitted to affect the metal in the body of the furnace. The charge is to be introduced to this furnace through a door or opening in the side, which should be bricked or plastered to exclude cold air during the process.

The furnace thus constructed, after having been heated, may be charged with the iron in a solid state, or may receive its charge of iron in a molten state from a smelting or reducing furnace. I propose generally, however, in connection with this improved process of converting iron into steel, (when the conversion is to be effected upon pig or cast iron,) first to refine the iron by my process which constitutes the subject-matter of Letters Patent No. 26,923, and to run the purified iron while in a fluid state from the reducing-furnace used in that process, in which case I introduce the substances employed for its conversion into the basin of the furnace before the fluid iron is run in. In case, however, of the iron being introduced into the reverberatory furnace in a solid state, the converting substances may be introduced either when the iron has become hot enough to give off its gases or before the introduction of the iron.

The quantity of the substances hereinabove specified which I employ for the conversion of the iron is generally in the proportion of about twenty-five (25) pounds of each of such substances to a ton of iron. I prefer to use pulverized oyster-shells to any other form of carbonate of lime on account of their high degree of purity, and I prefer the black oxide to any other oxide of manganese. The charcoal should be either pulverized or broken into small pieces.

The process of conversion is conducted in the following manner: If the iron has been introduced into the reverberatory furnace in a fluid state, I allow it to remain therein in the molten state, which is maintained by keeping the furnace at a proper heat until it is scorified, stirring it from time to time with a ravel or proper implement. I then take out some with a trier to ascertain its temper and quality, which can be at once known by the practiced steel-manufacturer, and if the degree of carbonization be not high enough I add a small quantity of carbonate of lime mixed with an equal quantity of pulverized charcoal wet with water; or, if the metal be too highly carbonized, I insert a green-wood pole through the working-door and force its end down through the molten metal to the bottom of the furnace, thereby supplying hydrogen to displace the excess of carbon, and producing an agitation of the whole body of the metal. When a proper temper or degree of carbonization is obtained the metal can be tapped from the furnace and molded ready for the hammer or rolls, as may be desired. If the iron has been introduced to the reverberatory furnace in a solid state, it is first allowed to melt, and after being melted is stirred from time to time till it is scorified, and then tested, and, according to its condition, proceeded with as before described.

When it is desired to obtain the steel from wrought-iron the iron is broken or cut into small pieces and put into the reverberatory furnace after the converting compound, and its fusion is facilitated by the introduction of a jet or jets of steam below or immediately above its surface. The converting compound also serves as a flux.

I do not claim the treatment of iron with any of the within-described agents, separately considered; but

What I claim as my invention, and desire to secure by Letters Patent, is—

The conversion of iron into steel by its treatment in the molten state with the compound of potash or other alkali, carbonate of lime, oxide of manganese, and charcoal, substantially in the manner herein specified.

E. G. POMEROY.

Witnesses:
B. GIROUXE,
M. M. LIVINGSTON.